US012670358B2

(12) United States Patent
Kim

(10) Patent No.: US 12,670,358 B2
(45) Date of Patent: Jun. 30, 2026

(54) METHOD AND DEVICE FOR GENERATING NEURON NETWORK COMPENSATED FOR LOSS DUE TO PRUNING

(71) Applicant: KOREA INSTITUTE OF SCIENCE AND TECHNOLOGY, Seoul (KR)

(72) Inventor: Suhyun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 806 days.

(21) Appl. No.: 17/964,452

(22) Filed: Oct. 12, 2022

(65) Prior Publication Data

US 2023/0124054 A1     Apr. 20, 2023

(30) Foreign Application Priority Data

Oct. 19, 2021     (KR) ........................ 10-2021-0139250

(51) Int. Cl.
G06N 3/04          (2023.01)
G06N 3/082         (2023.01)

(52) U.S. Cl.
CPC .............. G06N 3/04 (2013.01); G06N 3/082 (2013.01)

(58) Field of Classification Search
CPC ................................. G06N 3/04; G06N 3/082
See application file for complete search history.

(56) References Cited

U.S. PATENT DOCUMENTS

| | | | |
|---|---|---|---|
| 11,068,786 B1 | 7/2021 | Liu et al. | |
| 11,586,925 B2 * | 2/2023 | Chang .................... | G06N 3/084 |

| | | | |
|---|---|---|---|
| 2019/0147339 A1 | 5/2019 | Nachum et al. | |
| 2021/0174175 A1 * | 6/2021 | Choudhury .............. | G06N 3/08 |
| 2021/0287092 A1 * | 9/2021 | Nie ........................ | G06N 3/082 |
| 2021/0397963 A1 * | 12/2021 | Jiang ..................... | G06N 3/082 |

FOREIGN PATENT DOCUMENTS

| | | |
|---|---|---|
| EP | 3 367 309 A1 | 8/2018 |
| KR | 10-2124171 B1 | 6/2020 |

OTHER PUBLICATIONS

Li et al. 2004, "A Survey of Convolutional Neural Networks: Analysis, Applications, and Prospects", https://arxiv.org/pdf/2004.02806 (Year: 2004).*

Molchanov et al. Jun. 8, 2017, "Pruning Convolutional Neural Networks for Resource Efficient Inference", https://arxiv.org/pdf/1611.06440 (Year: 2017).*

Li, F. Liu, W. Yang, S. Peng and J. Zhou, "A Survey of Convolutional Neural Networks: Analysis, Applications, and Prospects," in IEEE Transactions on Neural Networks and Learning Systems, vol. 33, No. 12, pp. 6999-7019, Dec. 2022, doi: 10.1109/TNNLS.2021.3084827, (Year: 2022).*

Luo, Jian-Haoet al. "Thinet: A filter level pruning method for deep neural network compression." *Proceedings of the IEEE international conference on computer vision.* (2017). pp 1-11.

* cited by examiner

*Primary Examiner* — Matthew J Ellis
(74) *Attorney, Agent, or Firm* — NSIP Law

(57)          ABSTRACT

Embodiments relate to a method and device for generating a neural network that compensates for information loss due to pruning, including obtaining a trained neural network; pruning at least one neuron in the trained neural network; and updating one or more parameter values of a next layer in a pruned neural network based on one or more parameter values of at least one neuron among remaining neurons in a pruned target layer having the pruned neuron.

11 Claims, 9 Drawing Sheets

FIG. 8

METHOD AND DEVICE FOR GENERATING NEURON NETWORK COMPENSATED FOR LOSS DUE TO PRUNING

DESCRIPTION OF GOVERNMENT-SPONSORED RESEARCH

This study was made with the support of the Ministry of Science and ICT [Project title: Development of technology to respond to high-risk disaster medical care and industrial accidents, Project Identification No.: 1711151313, Sub-Project Identification No.: CRC-20-02-KIST].

This study was made with the support of the Ministry of Science and ICT [Project Title: Development of technology to improve the audio quality of remote multi-party video conference, Project Identification No.: 1711134747, Sub-Project Identification No.: 2021-0-00456-001].

CROSS-REFERENCE TO RELATED APPLICATION

The present application claims priority to Korean Patent Application No. 10-2021-0139250, filed Oct. 19, 2021, the entire contents of which are incorporated herein for all purposes by this reference.

BACKGROUND OF THE INVENTION

Field of the Invention

Embodiments of the present invention relate to a technology for generating a neural network, and more particularly, to a method and device for generating a neural network in which by using the one or more parameter values of remaining neurons in a pruned target layer and a next layer in a previously trained neural network in which neurons such as nodes or filters are pruned, one or more parameter values of a neuron in the next layer is updated.

Description of the Related Art

Pruning in a neural network refers to a process of deleting neurons or connections between neurons so that parameters of neurons in the neural network do not affect computation. In general, pruning can save cost significantly because it can reduce meaningless redundant connections in the network.

Such pruning is divided into unstructured pruning and structured pruning.

With unstructured pruning technique, a unit of weight element, such as a connection unit between neurons, is removed. In general, training of neural networks is performed by GPU. Considering the computational characteristics of the GPU, which compute the connections of neurons in a layer at once based on a parallel structure, the unstructured pruning technique is not effective in improving computational capability because the same number of cycle computation is performed on a neural network before pruning and a neural network after pruning.

Therefore, recently, an interest in structured technique for removing neurons, such as filters/channels/nodes, is increasing.

FIG. 1 illustrates a conceptual diagram of an unpruned neural network, and FIG. 2 illustrates a conceptual diagram of the neural network of FIG. 1 subjected to structured pruning.

Referring to FIGS. 1 and 2, when a filter itself corresponding to a neuron is removed from a neural network, the output value of the removed neuron is lost, and the loss of the output dimension B due to the removed neuron is occurred in the output dimension of the next layer. Accordingly, there is a limit in that information loss occurs in a final output value (e.g., feature map) of the neural network.

Documents of Related Art (Non-Patent Document 1) ThiNet: A Filter Level Pruning Method for Deep Neural Network Compression, ICCV, 2017

SUMMARY OF THE INVENTION

Embodiments of the present invention provide a method and device for generating a neural network in which side effects caused by neuron removal by pruning are compensated.

A method for generating a neural network that compensates for information loss due to pruning according to one aspect of the present invention is performed by a processor. The method may include obtaining a trained neural network; pruning at least one neuron in the trained neural network; and updating one or more parameter values of a next layer in a pruned neural network based on one or more parameter values of at least one neuron among remaining neurons in a pruned target layer having the pruned neuron.

In one embodiment, the step of updating may include the steps of selecting another neuron or a combination of other neurons most similar to the pruned neuron among the remaining neurons in the target layer; computing a merging value based on one or more parameter values of the selected other neuron or one or more parameter values of a plurality of other neurons underlying the combination and one or more parameter values of the pruned neuron; and computing a merging matrix including the merging value based on one or more parameter values of remaining neurons in the pruned target layer and one or more parameter values of a neuron in an unpruned target layer.

In one embodiment, the step of updating may further include the step of updating one or more parameter values of a neuron in the next layer in the pruned neural network based on one or more parameter values of the merging matrix and one or more parameter values of a neuron in the next layer in an unpruned neural network.

In one embodiment, the other neuron most similar to the pruned neuron may be a neuron having a most similar orientation among the remaining neurons in the pruned target layer. The merging value may be a ratio between the parameter value of the selected neuron and the parameter value of the pruned neuron.

In one embodiment, the combination of other neurons most similar to the pruned neuron may be one in which a result of combining two or more of the remaining neurons in the pruned target layer has the most similar orientation to the pruned neuron, and the combination may be a sum of the one or more parameter values.

In one embodiment, the merging matrix may include a plurality of merging values, and each of the plurality of merging values may be a coefficient of a sum of one or more parameter values for respective sub neurons of the selected combination.

In one embodiment, the merging matrix may be computed by decomposing a matrix of one or more parameter values of neurons in the unpruned target layer into a matrix of one or more parameter values of the remaining neurons in the pruned target layer and the merging matrix through a matrix decomposition way.

In one embodiment, one or more parameter values of neuron in the next layer in the pruned neural network may be updated through the following equation, $$W'_{i+1} = Z_i W_{i+1} \qquad \text{[Equation]}$$

wherein $W_{i+1}'$ is a matrix of the parameter value of neuron in the next layer in the updated, pruned neural network, $Z_i$ is the merging matrix, and $W_{i+1}$ is a matrix of one or more parameter values of neuron in the next layer in the un-updated, pruned neural network.

In one embodiment, the neural network may include at least some of a plurality of fully connected layers and a plurality of convolutional layers. The fully connected layer may include a node as the neuron, and the convolutional layer may include a filter as the neuron. Here, the parameter of the neuron may include at least one of a node parameter and a filter parameter.

In one embodiment, the neural network may include an activation function between the target layer and the next layer.

In one embodiment, when the activation function is ReLU, the step of updating may be performed when the merging matrix satisfies a preset specific condition. Here, the specific condition includes that the merging matrix $Z_i$ may have only non-negative component value.

In one embodiment, the specific condition may further include that the merging matrix has at most one positive component value per column.

A computer-readable recording medium according to another aspect of the present application may record a program for executing the method according the above described embodiments.

According to the method for generating a neural network according to an aspect of the present invention, it is possible to generate a neural network that partially or completely compensates for information loss due to pruning while reducing a network topology by pruning neurons in a layer included in the neural network.

In the method for generating a neural network, the step of merging the dimensions of the next layer according to at least one neuron of the remaining neurons in the pruned target layer with the dimension of the next layer according to the remaining neurons in the layer to compensate for the information loss does not substantially deteriorate the computational performance of neural networks that is improved by topology reduction. Therefore, it is possible to obtain the effect of reducing the resources of the neural network only by pruning without optimizing the neural network for the device desired to be utilized.

Ultimately, high-performance neural networks can be more easily utilized for devices with fewer resources.

Effects of the present invention are not limited to the effects mentioned above, and other effects not mentioned will be clearly understood by those skilled in the art from the description of the claims.

BRIEF DESCRIPTION OF THE DRAWINGS

In order to more clearly explain the technical solutions of the embodiments of the present invention or conventional art, drawings necessary for the description of the embodiments are briefly introduced below. It should be understood that the drawings below are for the purpose of explaining the embodiments of the present specification and not for the purpose of limitation. In addition, some components to which various modifications such as exaggeration and omission have been applied may be illustrated in the drawings below for clarity of description.

FIG. 8 is a conceptual diagram of a neural network having an activation function between fully connected layers according to an embodiment of the present invention.

DETAILED DESCRIPTION OF THE INVENTION

The terminology used herein is for the purpose of referring to specific embodiments only, and is not intended to limit the present invention. As used herein, the singular forms also include the plural forms unless the phrases clearly indicate the opposite. As used herein, the meaning of "comprising" specifies a particular characteristic, region, integer, step, operation, element and/or component, and does not exclude the presence or addition of another characteristic, region, integer, step, operation, element and/or component.

Although not defined otherwise, all terms including technical and scientific terms used herein have the same meaning as commonly understood by those of ordinary skill in the art to which the present invention belongs. Commonly used terms defined in the dictionary are additionally interpreted as having a meaning consistent with the related technical literature and the presently disclosed content, and unless defined, are not interpreted in an ideal or very formal meaning.

Hereinafter, embodiments of the present invention will be described in detail with reference to the drawings.

Figure 1:
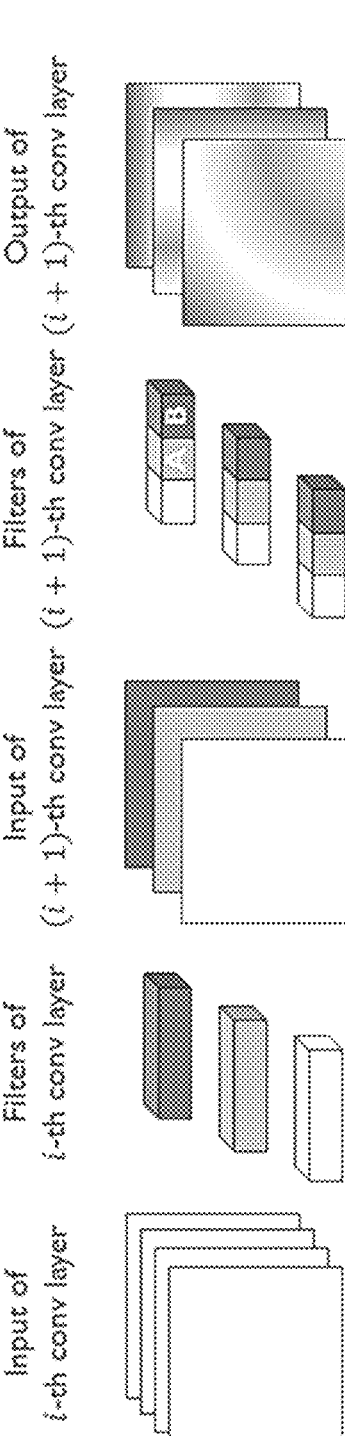
FIG. 1 is a conceptual diagram of an unpruned neural network.
Figure 2:
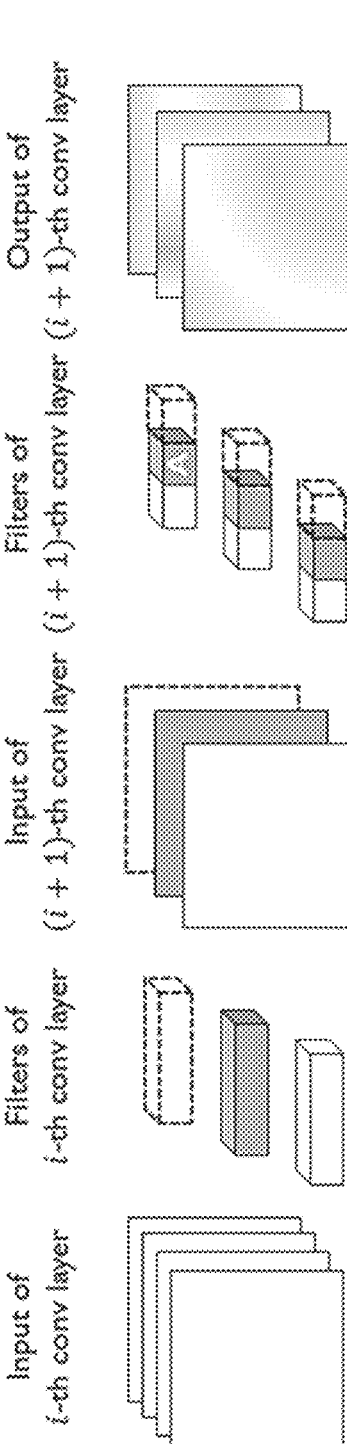
FIG. 2 is a conceptual diagram of the neural network of FIG. 1 subjected to structured pruning.
Figure 3:
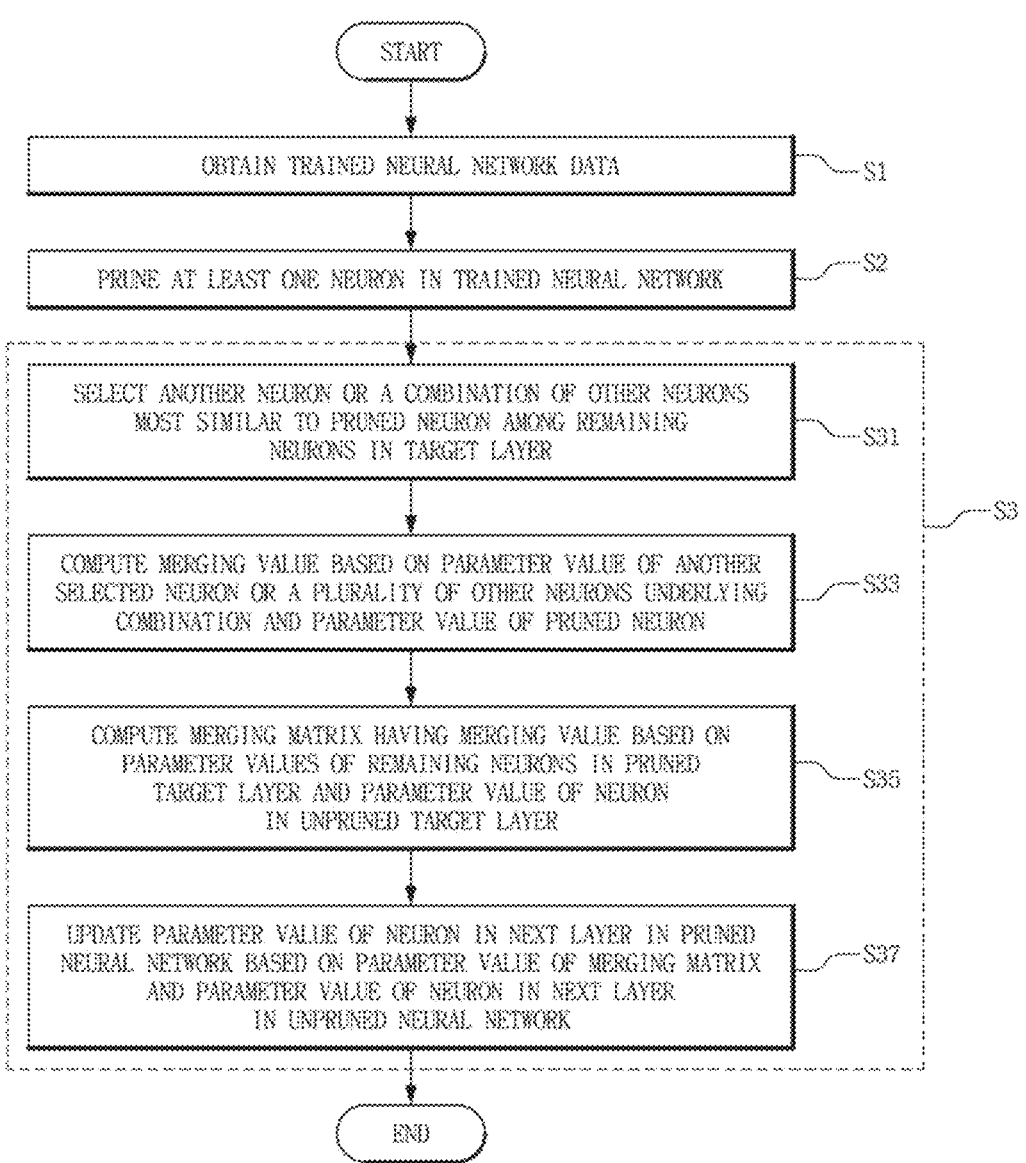
FIG. 3 is a flowchart of a method for generating a neural network according to an embodiment of the present invention.

FIG. 3 is a flowchart of a method for generating a neural network according to an embodiment of the present invention.

Referring to FIG. 3, a method for generating a neural network may include the steps of obtaining a trained neural network S1; pruning the trained neural network of step S2; and updating one or more parameter values of a next layer in the pruned neural network based on one or more parameter values of at least one neuron among the remaining neurons in the pruned target layer S3.

A neural network includes multiple layers. Each layer includes a number of neurons which are synaptically connected to each other. The neural network may be modeled with various artificial neural network (ANN) structures. For example, the neural network may be a convolution neural network (CNN).

A neuron of the neural network is a component constituting each layer, and may be implemented as an artificial neuron by a processor. The neuron of the neural network is configured to output an output value using its parameter value when receiving an input value. The neuron may include a node or filter (or channel).

A filter is a neuron configured to convolute input data. A convolutional layer, which is mainly used in CNN, includes a number of filters as neurons. A number of neurons (i.e., filters) in a convolutional layer is connected to only a few of filters located in other adjacent convolutional layers. Also, since all filters in a convolutional layer are connected to other convolutional layers in the same way, they share the same value of filter weights and structures. A convolution operation is applied to the connection between the convolutional layer and the convolutional layer, and an operation for extracting features by convolving an input with a filter is performed.

When a filter is applied to the input data of the convolutional layer, a channel is generated for each filter. When one convolutional layer includes a plurality of filters, a plurality of channels may be generated. Output data for a plurality of channels may be matrixed, and the size of the output data indicates a dimension of the matrix of the corresponding layer.

The convolution layer may express output data as a tensor, which is a multidimensional array, in which a two-dimensional array that can be expressed as a matrix is extended to a higher dimension, and may be matrixed.

A node is a neuron configured to compute input data based on a preset weight and/or bias value. In an ANN or CNN, a fully connected layer mainly includes this node as a neuron.

The fully connected layer includes a number of nodes corresponding to artificial neurons and does not include filters. The fully connected layer does not have a connection relationship between nodes located on the same layer, but has a connection relationship between nodes located on an immediately adjacent layer (e.g., another layer that receives an input or transmits an output). Each neuron (i.e., node) included in the fully connected layer is connected to all neurons in a previous layer.

The neural network is configured to have the ability to solve a specific task through machine learning. The neural network can also be defined by a connection pattern between neurons in an inner layer, an activation function that adjusts output values, and a learning process that updates model parameters.

The parameters of the neural network are determined by learning in the neural network. It is distinct from hyper parameters whose values must be set in advance before learning.

The parameter of the neural network may include a filter weight, a node weight/bias, and the like. For example, when the neural network is a CNN, a filter weight and a node weight are trained to have an appropriate value to solve a purposed task through learning.

The hyper parameter may include a learning rate, the number of iterations, a mini-batch size, an initialization function, whether to compensate for pruning, and the like.

In step S1, a neural network that has been subject to a learning by various machine learning techniques already known at the time of filing of the embodiments, such as a backpropagation technique, a gradient descent technique, and the like, and has determined weights is obtained. The learning of the neural network can be considered as a process of determining a weight that minimizes a loss function depending on a predicted value and an actual output value. The trained neural network has a weight for which the loss function is minimized.

In one embodiment, the neural network may be subjected to structured pruning. At least one neuron in the layer is deleted by the structured pruning process. For example, when an i-th convolutional layer in the neural network is pruned, at least one filter in the i-th convolutional layer may be deleted. Alternatively, when an i-th fully connected layer in the neural network is pruned, at least one node in the i-th fully connected layer may be deleted.

Selecting a target neuron to be pruned in a neural network and pruning the target neuron may be performed by various pruning techniques already known at the time of filing of the present embodiments. For example, a target neuron to be pruned may be selected and removed by the pruning technique described in Non-Patent Document 1 (ThiNet: A Filter Level Pruning Method for Deep Neural Network Compression, ICCV, 2017). The embodiments of the present invention are not limited to the pruning technique of Non-Patent Document 1.

Figure 4:
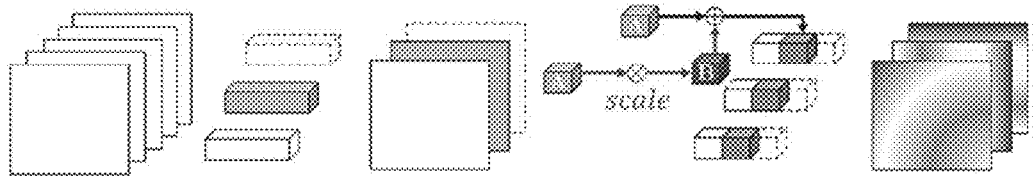
FIG. 4 is a conceptual diagram illustrating a process of compensating for a pruned portion according to an embodiment of the present invention.

FIG. 4 is a conceptual diagram illustrating a process of compensating for a pruned portion according to an embodiment of the present invention.

FIG. 4 illustrates that neurons F1, F2, and F3 have individual one or more parameter values (e.g., weights) by learning, as represented by individual colors. In a state in which the neurons are equally included in an i-th convolutional layer, the neuron F3 is pruned.

Referring to FIG. 4, in step S3, the parameter value (e.g., filter weight, node weight, etc.) of the neuron in the next layer to which the output of the target layer having the neuron pruned in step S2 is transmitted is updated.

The weight of the neuron in the next layer produces a dimension B' corresponding to the dimension B in the next layer for the neuron F3, which is lost due to the pruning of the neuron F3, and updated to output the result of merging the produced dimension with the dimensions in the next layer for the remaining neurons within the pruned target layer.

As such, the update process of step S3 includes a process for merging a dimension and a dimension with each other, which may be referred to as a merging step. That is, the step S3 includes a step of merging dimensions.

In step S3, the dimension B' corresponding to the dimension B lost by pruning is produced using the parameter value of at least one neuron among the remaining neurons of the target layer having the pruned neuron. That is, based on the weight of at least one neuron among the remaining neurons in the target layer, the weight of at least one neuron included in the next layer is updated.

Accordingly, when the i-th layer is pruned as a target layer, the weight of the neuron included in the i+1-th layer is updated based on the weight of at least one neuron among the remaining neurons in the i-th layer. With the updated weight, the i+1-th layer outputs an output value in which information loss due to pruning is partially or fully compensated.

The merging operation of step S3 may be performed when a convolution layer is pruned to remove at least one filter, and/or a fully connected layer is pruned to remove at least one node in step S2.

The specific process of the merging step S3 will be described in more detail with reference to FIGS. 5 and 6.

Figure 5:
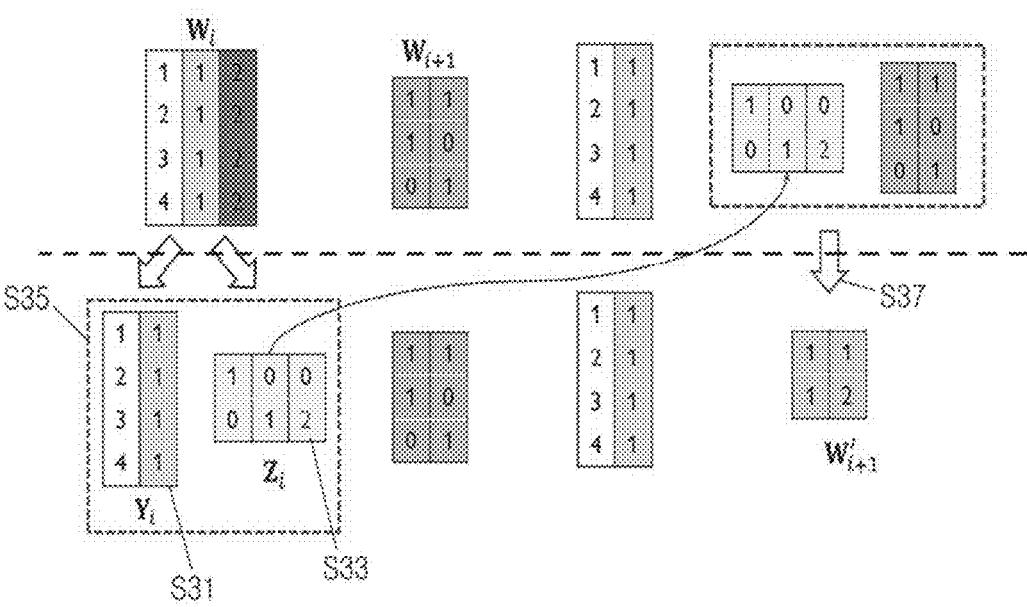
FIG. 5 is a conceptual diagram mathematically illustrating a merging process according to an embodiment of the present invention.

FIG. 5 is a conceptual diagram mathematically illustrating a merging process according to an embodiment of the present invention.

FIG. 5 illustrates an example in which the neuron F1 has the weight of (1, 2, 3, 4), the neuron F2 has the weight of (1, 1, 1, 1), and the neuron F3 has the weight of (2, 2, 2, 2). In this example, it is assumed that the neuron F3 is deleted by the pruning of step S2 as illustrated in FIG. 5.

In one embodiment, the merging step S3 may include the steps of selecting another neuron or a combination of other neurons most similar to the pruned neuron among the remaining neurons included in the target layer (for example, pruned convolution layer) having the pruned neuron (for example, filter) S31, computing a merger value based on the weight of the pruned neuron and the weight of the other selected neuron or a plurality of other neurons underlying the combination S33, and computing a merging matrix having the merging value based on the weights of the remaining neurons in the pruned target layer and the weights of the neurons in a unpruned target layer S35.

When the neuron F3 is pruned as illustrated in FIG. 5, one neuron most similar to the target neuron F3 may be selected from among the remaining neurons (e.g., filters F1 and F2) of the pruned i-th layer S31.

The merging matrix is a matrix representing compensation for information loss according to the removed element. The merging value is a main component for compensating for the merging matrix to compensate for the deletion of a neuron by pruning, and may be a ratio between the weight of the other selected neuron or combination thereof and the weight of the pruned neuron S33.

In an embodiment, the neuron most similar to the target neuron F3 may be a neuron having the most similar orientation to the target neuron F3 among the remaining neurons in the pruned target layer.

Figure 6:
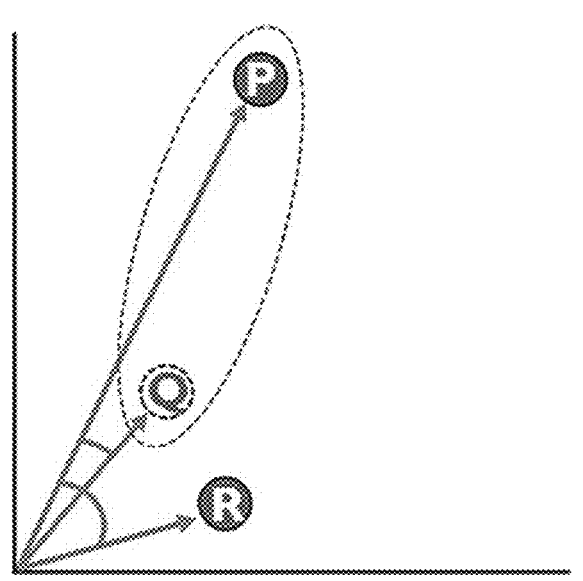
FIG. 6 is a diagram illustrating a most similar neuron according to an embodiment of the present invention.

FIG. 6 is a diagram illustrating a most similar neuron according to an embodiment of the present invention.

Referring to FIG. 6, when another single neuron of the pruned convolutional layer is used to compute the merging matrix in step S3, the single neuron may be a neuron having the most similar orientation to the pruned neuron.

In FIG. 6, a vector Q represents a pruned neuron, and vectors P and R represent the remaining neurons in the target layer.

In a machine learning technology field, the similarity between neurons in a neural network is computed to an extent that they are close to each other in a vector plane. For example, in a general view, by comparing the distances between vectors corresponding to each neuron on the vector plane of FIG. 6, the vector Q and the vector R having the closest distance are treated as the most similar neurons.

On the other hand, in step S3, the similarity between neurons is determined by a direction, not an absolute distance. The other neuron most similar to the pruned neuron used in computing the merging matrix in step S3 is the neuron with the most similar orientation. That is, the neuron corresponding to the vector P having the most similar orientation to the vector Q corresponding to the pruned neuron is selected as the most similar neuron.

The orientation between the neurons may be computed through cosine similarity, but is not limited thereto, and various computation methods for comparing the orientations between vectors may be used.

When one most similar neuron is selected, a merging value is obtained by computing a ratio between the weight of the selected single neuron and the weight of the pruned neuron S33.

Alternatively, in order to compute the merging matrix $Z_i$, combinations of the remaining neurons may be computed and one combination most similar to the target neuron F3 may be selected from among the computed combinations S31. Then, a plurality of summed values may be obtained by computing a ratio between the weight of each sub neuron of the selected combination and the weight of the pruned neuron S33.

The sub neurons of the selected combination are two or more of the remaining neurons in the pruned target neuron. Two or more neurons may be combined through a weighted sum. A weight in the weighted sum is a coefficient of a neuron parameter (e.g., a node weight), and has a value of zero, a positive value, or a negative value. That is, each of the plurality of merging values is a coefficient of the weighted sum for each sub neuron of the selected combination.

As described with reference to FIG. 6, the resulting combination most similar to the pruned neuron is the result of the weighted sum having the most similar orientation to the pruned neuron.

Alternatively, a combination of the remaining neurons is computed, and a combination or single neuron most similar to the target neuron F3 may be selected from the computed combinations and single neurons S31. When the selected one is a combination, a plurality of merging values may be computed, and when the selected one is a single neuron, a single merging value may be computed S33.

Referring back to FIG. 5, the neuron F2 is selected as the neuron or combination most similar to the pruned neuron F3 among the remaining neurons F1 and F2 S31. Then, "2", which is a ratio between the weight of the filter F3 and the weight of the selected filter F2, is computed as a merging value.

When the merging value is computed S33, the merging matrix $Z_i$ is computed S35. In order to compute the merging matrix $Z_i$, the weights of neurons in a layer may be arranged. For example, the weights of neurons in a layer may be arranged in the form of a matrix or a tensor.

The merging matrix $Z_i$, the weight of the unpruned i-th layer (i.e., target layer) and the weight of the pruned i-th layer have a relationship expressed by the following equation.

$$W_i \approx Y_i Z_i \qquad \text{[Equation 1]}$$

Here, $Y_i$ denotes a matrix of weights of the remaining neurons in the pruned target layer, and $W_i$ denotes a matrix of weights of the neurons in the unpruned target layer. $Y_i \in R^{N_i \times P_{i+1}}$, $Z_i \in R^{P_{i+1} \times N_{i+1}}$ (where $0 < P_{i+1} \leq N_{i+1}$), where $P_i$ is the number of remaining neurons in the pruned i-th layer, and $N_i$ is the number of original neurons in the unpruned i-th layer.

The merger matrix $Z_i$ is computed by applying various decomposition ways for decomposing a single matrix defined by Equation 1 into two matrices (or tensors) S35. The merging matrix $Z_i$ is computed by decomposing the matrix of weights of the neurons in the unpruned target layer into the matrix of weights of the remaining neurons in the pruned target layer and the merging matrix through a pre-stored matrix decomposition way S35.

The decomposition way may be, for example, Canonical Polyadic (CP) or Tucker way, but is not limited thereto.

The number of rows of the merging matrix $Z_i$ depends on the number of columns (i.e., $P_i$) of the matrix $Y_i$ of weights of the remaining neurons in the pruned target layer, and the number of columns of the merging matrix $Z_i$ depends on the number of columns (i.e., $N_{i+1}$) of the matrix $W_i$ of weights of neurons in the unpruned target layer.

In this decomposition process, in step S35, based on the matrix $Y_i$ of weights of the remaining neurons in the pruned target layer and the matrix $W_i$ of weights of neurons in the unpruned target layer, the merging matrix having the matrix value is computed. The position of the merging value and/or the values and positions of the remaining components excluding the merging value may be computed according to the position of each array element corresponding to the node in the hierarchy of each array ($Y_i$, $W_i$). In the example of FIG. 5, the components of the remaining columns in the merging matrix $Z_i$ except for the column (hereinafter, merging column) having the merging value are computed based on the components corresponding to the neurons F1 and F2 each included in the matrix $W_i$ and the matrix $Y_i$.

Using the merging matrix computed in this way, a new dimension corresponding to the dimension in the next layer for the pruned neuron is merged with the dimension in the next layer for the remaining neurons.

In the above embodiment, the merging step S3 includes the step of updating the weight of neuron in the next layer in the pruned neural network based on the merging matrix value and the weight of neuron in the next layer in the unpruned neural network S37. If pruning is not performed in the next layer, the matrix of weight of neuron in the next layer is maintained regardless of whether pruning is performed in the previous layer (i.e., the target layer).

In step S37, the weight of neuron in the next layer may be updated as a product of the merging matrix and the matrix $W_{i+1}$ of weight of neuron in the next layer in the un-updated, pruned neural network.

That is, the weight $W_{i+1}$ of neuron in the next layer in the pruned neural network is updated as a matrix $W_{i+1}'$ of new values by the following equation.

$$W_{i+1}' = Z_i W_{i+1} \qquad \text{[Equation 2]}$$

In the updated neural network, when the output value of the pruned target layer is transmitted to the next layer, the output value of the pruned target layer is applied to the new weight of the next layer, and the output value of the next layer in the updated pruned neural network is computed. The updated pruned neural network has a value updated through Equation 2 above.

The output value of the next layer in the updated pruned neural network is relatively compensated for information loss due to pruning, compared to the output value of the next layer in the un-updated pruned neural network.

For example, as illustrated in FIG. 5, it is assumed that when the matrix $Z_i$ and the matrix $W_{i+1}$ are combined by a matrix product, after the weight of the neuron in the i+1th layer is updated as the matrix $W_{i+1}'$, the input data xi is input to the pruned i-th layer. Thus, the output value of the i-th layer is $Y_i^T xi$ (where T is a transposed matrix). The output value $Y_i^T xi$ of the i-th layer is used as an input value of the i+1-th layer.

As the matrix $W_{i+1}$ value in FIG. 5 is maintained as it is, if there is no update of the weight of neuron in the next layer due to the merging, the output value of the i+1th layer is computed as $W_{i+1}^T (Y_i^T x_i)$. This value has a difference from the output value of the unpruned i+1th layer in the neural network, that is, $W_{i+1}^T (W_i^T x^i)$, as illustrated in the component values of the matrix illustrated in FIG. 5. This difference corresponds to the information loss that occurs when there is no update.

On the other hand, in a case where the weight of the pruned neuron is equal to or similar to a positive multiple of the weight of the same or similar other neuron or combination as illustrated in FIG. 5, if the weight of neuron in the next layer in the pruned neural network is updated, the output value of the i+1th layer, that is, $W_{i+1}^T (Y_i^T x_i)$ is the same as or relatively similar to $W_{i+1}^T (W_i^T xi)$.

As such, the merging matrix Zi updates the weight of neuron in the next layer in the pruned neural network, so that loss is not occurred in some or all of the output data in the next layer. Eventually, some or all of the information loss of the pruned neural network is compensated.

In alternative embodiments, the merging step S3 of updating the weight of neuron in the next layer by using the merging matrix may be performed when the merging matrix satisfies a specific condition. The specific condition is set when the neural network includes an activation function between the pruned convolutional layer and the next convolutional layer.

In an embodiment, when the activation function is ReLU, the specific condition may include that the merging matrix $Z_i$ has only non-negative component values. Also, in some embodiments, the specific condition may further include that the merging matrix $Z_i$ has at most one positive component value per column. Then, the weight of the next convolution layer is updated only when the condition that the merging matrix $Z_i$ includes at most one positive component value per column while including only non-negative component values is satisfied.

Figure 7:
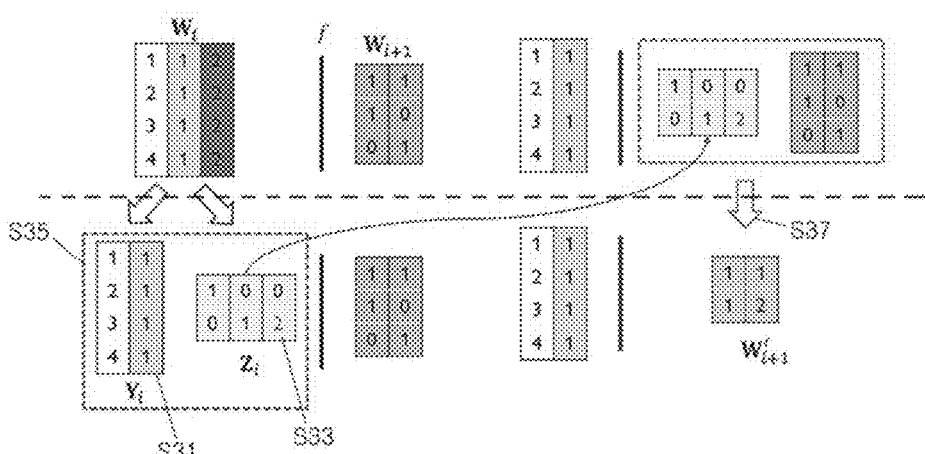
FIG. 7 is a conceptual diagram of a neural network having an activation function between convolutional layers according to an embodiment of the present invention.

FIG. 7 is a conceptual diagram of a neural network including an activation function between convolutional layers according to an embodiment of the present invention.

When Equation 1 is applied to the convolutional layer, the weight of a filter may be arranged in a 4-way tensor. Then, Equation 2 may be rearranged as the following Equation.

$$\mathcal{W}_i \approx \mathcal{Y}_i \times_1 Z_i^T \qquad \text{[Equation 3]}$$

Here, $Wi \in R^{Ni+1 \times Ni \times K \times K}$ and $yi \in R^{Pi+1 \times Ni \times K \times K}$. Here, $N_i$ is the number of filters in an i-th convolutional layer in the unpruned neural network. $P_i$ is the number of filters in an i-th convolutional layer in the pruned neural network. K is the horizontal and vertical sizes of input data input to the convolution layer, and may be, for example, the horizontal and vertical sizes of a feature map.

The output value of the i+1th convolution layer in the unpruned neural network is expressed by the following equation including the convolution operation.

$$\mathcal{A}_{i+1} = \mathcal{W}_{i+1} \circledast f(\mathcal{W}_i \circledast X_i) \qquad \text{[Equation 4]}$$

Here, A is the output data of a convolutional layer to which an activation function is applied, referred to as an activation feature map. F represents the activation function. For example, the activation function may be ReLU.

When the above-described specific condition is satisfied, the following Equation 5 is obtained from Equation 4 above. In this case, f is ReLU $$
\begin{aligned}
\mathcal{A}_{i+1} &\approx \mathcal{W}_{i+1} \circledast (f(\mathcal{Y}_i \circledast \chi_i) \times_1 Z_i^T) \qquad \text{[Equation 5]} \\
&= (\mathcal{W}_{i+1} \times_2 Z_i) \circledast f(\mathcal{Y}_i \circledast \chi_i) \\
&= \mathcal{W}_{i+1}' \circledast f(\mathcal{Y}_i \circledast \chi_i),
\end{aligned}
$$

wherein $\mathcal{W}_{i+1}' = (\mathcal{W}_{i+1} \times_2 Z_i) \in \mathbb{R}^{N_{i+2} \times P_{i+1} \times K \times K}$ As expressed by Equation 5 above, the activation feature map of the i+1th convolutional layer in the unpruned neural network and the activation feature map of the i+1th convolutional layer in the pruned neural network are the same or similar to each other. That is, even after pruning in which the filter in the i-th convolutional layer decreases from $N_{i+1}$ to $P_{i+1}$ is performed after merging, the network topologies before and after pruning are consistent with each other.

Figure 8:
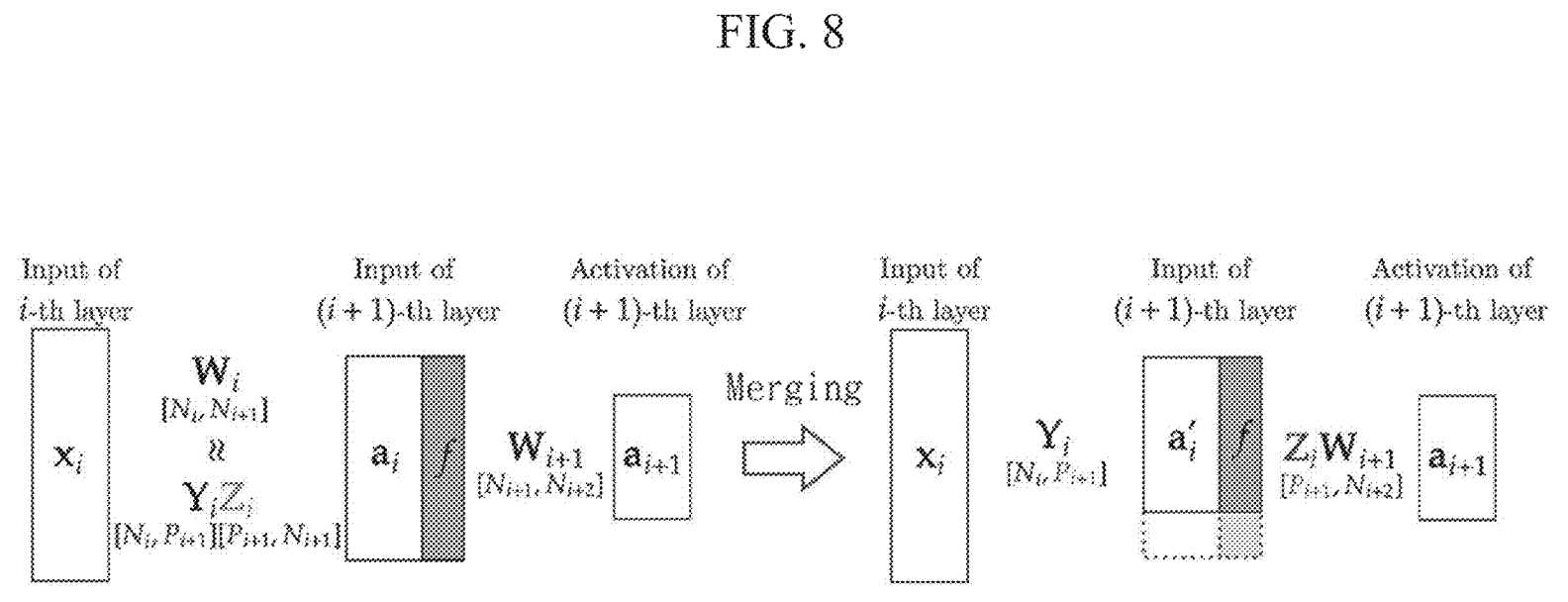

FIG. 8 is a conceptual diagram of a neural network including an activation function between fully connected layers according to an embodiment of the present invention.

Since the process of updating the weight of node in the fully connected layer illustrated in FIG. 8 is similar to the process of updating the weight of filter in the convolution layer illustrated in FIG. 7, the description is mainly based on the differences.

The neural network obtained in step S1 includes a plurality of fully connected layers. The weights of nodes included in the fully connected layer (e.g., weights) are in a state in which learning is completed. Each of the weights of the i-th fully connected layer and the weight of the i+1-th fully connected layer in FIG. 8 has a component of the matrix $W_i$, $W_{i+1}$ as a value optimized to solve the purpose of the neural network. In FIG. 8, $N_i$ is the number of nodes included in the i-th layer in the unpruned neural network, and $P_i$ is the number of nodes included in the i-th layer in the pruned neural network.

In step S2, at least one node included in the target fully connected layer (i.e., the i-th fully connected layer) is removed. Then, in step S3, the merging matrix Zi including the merging value is computed.

The merging matrix Zi is computed in Equation 1 above. Here, as $Y_i \in \mathbb{R}^{N_i \times P_{i+1}}$, $Z_i \in \mathbb{R}^{P_{i+1} \times N_{i+1}}$, $0 < P_{i+1} \leq N_{i+1}$.

As in FIG. 7, in the neural network including the activation function between the i-th fully connected layer and the i+1th fully connected layer, if not pruned yet, the activation vector of the i+1th fully connected layer is expressed by the following mathematical formula.

$$ a_{i+1} = W_{i+1}^{\top} f(W_i^{\top} \cdot x_i) \qquad \text{[Equation 6]} $$

Here, $x_i$ is the input vector of the i-th fully connected layer, and f denotes the activation function such as ReLU.

Equation 6 is converted to the following Equation by Equation 1 above.

$$ a_{i+1} \approx W_{i+1}^{\top} f(Z_i^{\top} Y_i^{\top} x_i) \qquad \text{[Equation 7]} $$

In order for the activation function to have no effect on updating the weight of the next fully connected layer, that is, the i+1th fully connected layer, the output of the i+1th fully connected in the pruned neural network of which value is updated through Equation 3 above, should match the output of the i+1th fully connected layer in the unpruned neural network. This relationship is expressed by the following equation.

$$ a_{i+1} \approx W_{i+1}^{\top} Z_i^{\top} f(Y_i^{\top} x_i) = (Z_i W_{i+1})^{\top} f(Y_i^{\top} x_i) = (W_{i+1}')^{\top} f(Y_i^{\top} x_i) \quad \text{[Equation 8]} $$

In order to maintain the relationship of Equation 8, like the specific condition for the neural network including the convolutional layer described with reference to FIG. 7, the merging matrix $Z_i$ must satisfy the same specific condition. That is, even for the activation function of the fully connected layer, the specific condition may be that the merging matrix $Z_i$ has only non-negative component values.

Also, in some embodiments, the specific condition may be also that the merging matrix $Z_i$ includes at most one positive component value per column.

If the merging matrix $Z_i$ for compensating the fully connected layer satisfies the above specific condition, the relationship before and after pruning under the activation function (i.e., $f(Z^T Y_i^T x_i) = Z^T f(Y_i^T x_i)$) is maintained.

In this way, it is possible to generate a neural network that partially or completely compensates for information loss due to pruning through the steps S1 to S3 from an original neural network having an activation function or a fully connected/convolutional layer. In the neural network generated through these steps S1 to S3, the network topology of the neural network after the merging in step S3 matches the network topology of the neural network in step S2, so it also has the pruning effect that a computation speed is improved despite the compensation for loss.

The above-described method for generating a neural network may be performed by a computing device (e.g., a neural network generating device) including a processor.

A device for generating a neural network according to embodiments may have aspects of entirely hardware, entirely software, or partly hardware and partly software. For example, a device or system may refer collectively to hardware with data processing ability and operation software that operates it. As used herein, the term "unit", "module", "device", or "system" is intended to refer to a combination of hardware and software that runs by the corresponding hardware. For example, hardware may be a data processing device including a Central Processing Unit (CPU), a Graphic Processing Unit (CPU) or other processor. Additionally, software may refer to a process in execution, an object, an executable, a thread of execution and a program.

It will be obvious to those skilled in the art that the device for generating a neural network may include other components not described herein. For example, the device for generating a neural network may include other hardware elements necessary for the operation described herein, including network interfaces, input devices for data entry, and output devices for displaying, printing or other type of data displaying.

Figure 9:
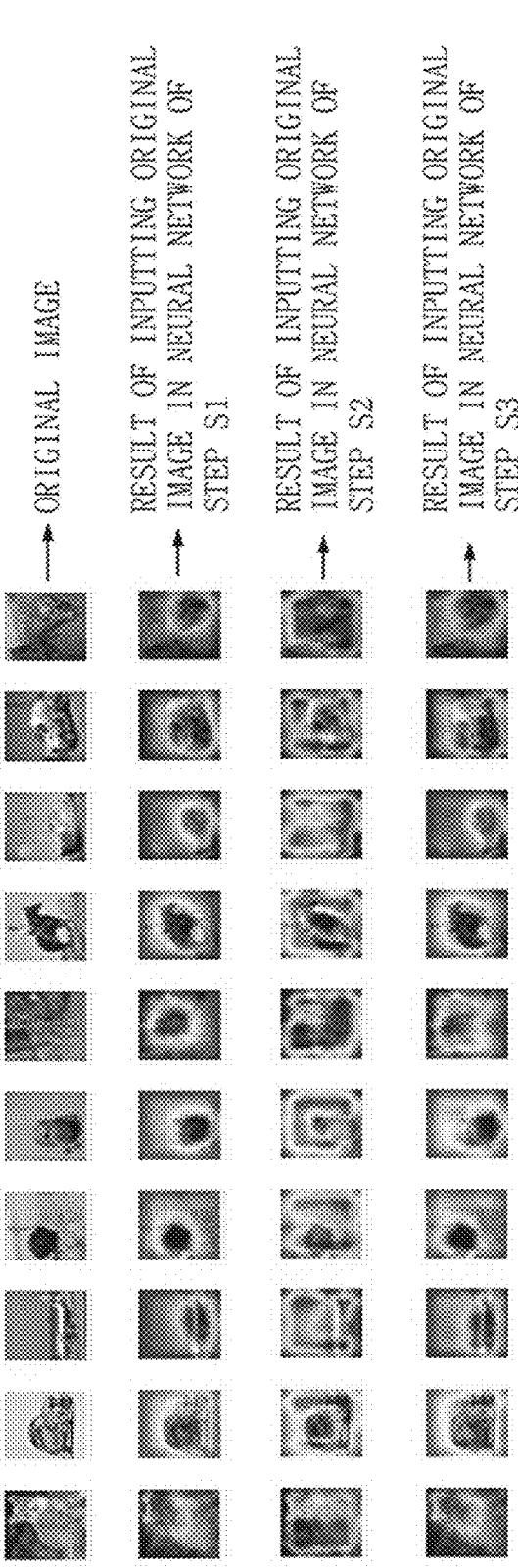
FIG. 9 is a diagram for explaining a performance of a neural network according to an experimental example of the present invention.

FIG. 9 is a diagram for explaining the performance of a neural network according to an experimental example of the present invention.

In one experimental example, a series of original images, arranged in the top row of FIG. 9, is input to the trained neural network in step S1, the pruned neural network in step S2, and the neural network in which loss is compensated in step S3, respectively.

A well-trained neural network has similar performance to that of analyzing the original image. However, if such a well-trained neural network is simply pruned, the performance of analyzing the original image is relatively degraded.

On the other hand, the neural network for which the loss of step S3 is compensated has similar performance to the trained model of step S1.

The operation by the system and method for generating a neural network according to the embodiments as described above may be, at least in part, implemented as a computer program and recorded on computer-readable recording media. For example, it may be implemented together with program products implemented as computer-readable media including program code, and may be executed by the processor for performing any or all steps, operations, or processes described herein.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording media includes any type of recording and identification device in which computer-readable data is stored. Examples of the computer-readable recording media include ROM, RAM, CD-ROM, magnetic tape, floppy disk and optical data storage and identification devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

Although the present invention as described above has been described with reference to the embodiments shown in the drawings, it will be understood that these are merely exemplary, and that various modifications and variations of the embodiments are possible therefrom by those of ordinary skill in the art. However, such modifications should be considered to be within the technical protection scope of the present invention. Accordingly, the true technical protection scope of the present invention should be defined by the technical spirit of the appended claims.

What is claimed is:

1. A computer-implemented method for generating a neural network that compensates for information loss due to pruning performed by a processor, the method comprising:
obtaining a trained neural network;
pruning at least one neuron in the trained neural network; and
updating one or more parameter values of a next layer in a pruned neural network based on one or more parameter values of at least one neuron among remaining neurons in a pruned target layer having the pruned neuron,
wherein the step of updating includes the steps of:
selecting another neuron or a combination of other neurons most similar to the pruned neuron among the remaining neurons in the target layer;
computing a merging value based on one or more parameter values of the selected other neuron or one or more parameter values of a plurality of other neurons underlying the combination and one or more parameter values of the pruned neuron; and
computing a merging matrix including the merging value based on one or more parameter values of remaining neurons in the pruned target layer and one or more parameter values of a neuron in an unpruned target layer,
wherein one or more parameter values of neuron in the next layer in the pruned neural network is updated through the following equation, $$W'_{i+1} = Z_i W_{i+1} \qquad \text{[Equation]}$$

wherein $W'_{i+1}$ is a matrix of the parameter value of neuron in the next layer in the updated, the pruned neural network, $Z_i$ is the merging matrix, and $W_{i+1}$ is a matrix of one or more parameter values of neuron in the next layer in the un-updated, the pruned neural network,
wherein the pruning comprises structured channel pruning of a convolutional neural network (CNN), and the compensation is applied to the filter weights of a next convolutional layer in the CNN, wherein the merging matrix Zi is configured to recover inference performance degradation caused by the pruning.

2. The method according to claim 1, wherein the step of updating further includes the step of updating one or more parameter values of a neuron in the next layer in the pruned neural network based on one or more parameter values of the merging matrix and one or more parameter values of a neuron in the next layer in an unpruned neural network.

3. The method according to claim 1, wherein the other neuron most similar to the pruned neuron is a neuron having a most similar orientation among the remaining neurons in the pruned target layer,
the merging value is a ratio between the parameter value of the selected neuron and the parameter value of the pruned neuron.

4. The method according to claim 1, wherein the combination of other neurons most similar to the pruned neuron is one in which a result of combining two or more of the remaining neurons in the pruned target layer has the most similar orientation to the pruned neuron, and the combination is a sum of the one or more parameter values.

5. The method according to claim 4, wherein the merging matrix includes a plurality of merging values, and each of the plurality of merging values is a coefficient of a sum of one or more parameter values for respective sub neurons of the selected combination.

6. The method according to claim 1, wherein the merging matrix is computed by decomposing a matrix of one or more parameter values of neurons in the unpruned target layer into a matrix of one or more parameter values of the remaining neurons in the pruned target layer and the merging matrix through a matrix decomposition way.

7. The method according to claim 1, wherein the neural network includes at least some of a plurality of fully connected layers and a plurality of convolutional layers,
the fully connected layer includes a node as the neuron, and the convolutional layer includes a filter as the neuron,
the parameter of the neuron includes at least one of a node parameter and a filter parameter.

8. The method according to claim 1, wherein the neural network includes an activation function between the target layer and the next layer.

9. The method according to claim 8, wherein when the activation function is ReLU, the step of updating is performed when the merging matrix satisfies a preset specific condition, the specific condition includes that the merging matrix $Z_i$ has only non-negative component value.

10. The method according to claim 9, wherein the specific condition further includes that the merging matrix has at most one positive component value per column.

11. A non-transitory computer-readable recording medium which records a program for executing the method according to claim 1.

\* \* \* \* \*